April 21, 1931. O. GEORG 1,802,247
PRESSURE SAFETY DEVICE
Filed Nov. 2, 1926   2 Sheets-Sheet 1
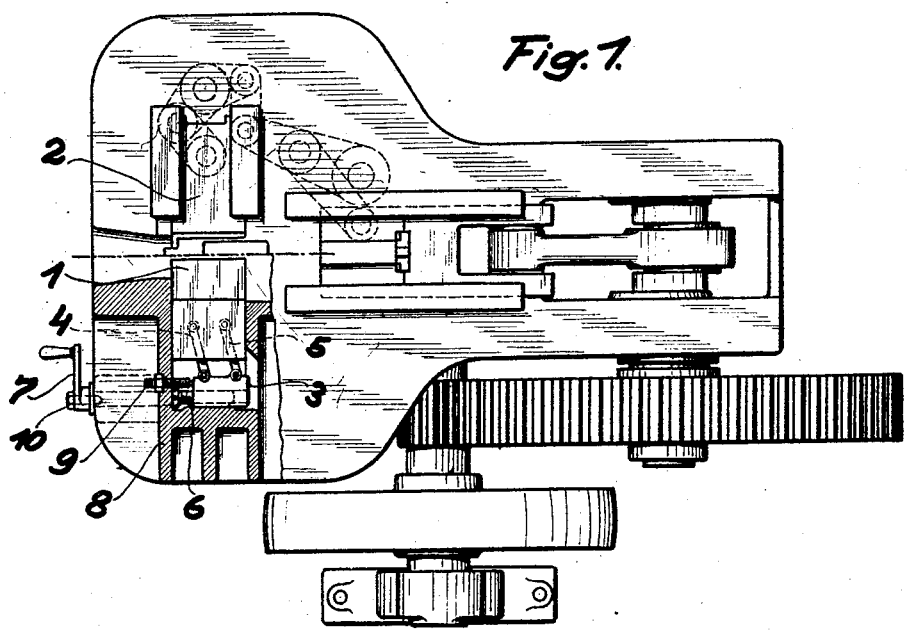
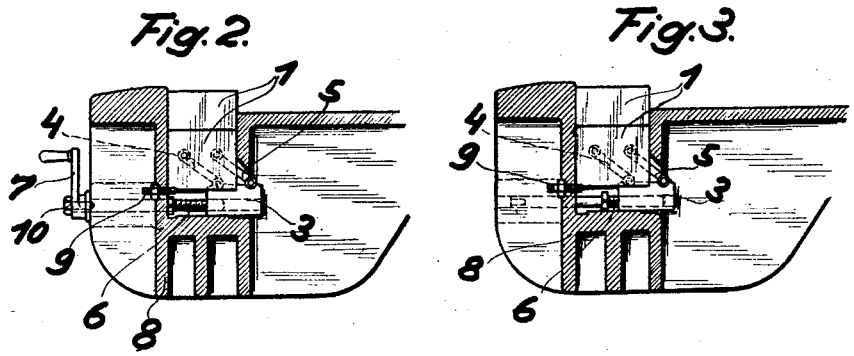
Inventor
Otto Georg

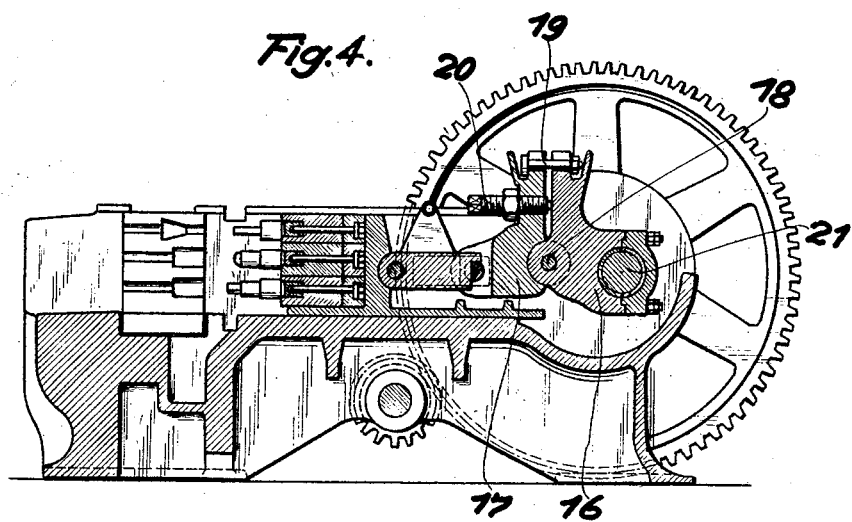
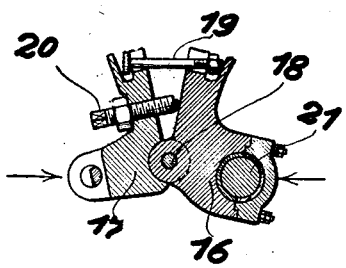 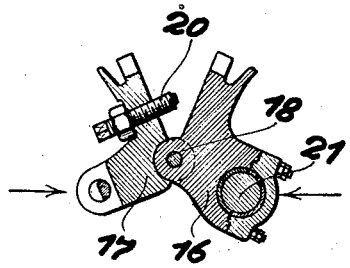

Patented Apr. 21, 1931

1,802,247

UNITED STATES PATENT OFFICE

OTTO GEORG, OF DUSSELDORF, GERMANY

PRESSURE SAFETY DEVICE

Application filed November 2, 1926, Serial No. 145,791, and in Germany December 5, 1925.

This invention refers broadly to safety devices against excessive pressures for forging machines, presses and the like, and it is intended to provide particularly reliable and easily manipulated means of the kind referred to and to generally improve the construction and manufacture of such devices. The safety devices heretofore in use and adapted to prevent the breaking or disarrangement of machinery, such as forging machines, presses and the like by the influence of excessive pressure and similar strains are dependent to a large extent on constructional features of manufacture, so that inaccuracies in the treatment of the materials to be engaged with each other in the operation, and differences in the nature of these materials are likely to produce considerable differences in the mode of operation of such safety-devices in view of the variable fractional values inherent to such material.

Now in accordance with this invention a safety device of the kind referred to is produced which is free from the inconveniences mentioned, and which is adapted to be adjusted for each particular machine, and which may be regulated and re-adjusted at any time during operation, so as to compensate the wear and to conform to any changes of the fractional values.

In the practice of this invention and in a preferred construction use is made of a safety device of an otherwise known kind and commonly known as a flexure rod or buckling or collapsing rod, the said rod or bar being provided according to my invention with pivoting means or a kind of link-connection spaced from the center of compressing strain and possessing a tendency of being flexed or collapsed. This collapsing or flexing is however obviated in this invention by a detrusion or shearing member, bolt or the like, or by a similar resistance body. The said member, detrusion or tearing bolt or the like is so constructed and adjusted that the part of machinery intended for the absorption of the pressure will collapse, buckle or flex upon the overstepping of the maximum pressure.

In the case of the flexing or collapsing bar as known from the prior art the positioning of the not-centrally disposed link remains constant. Now my invention is distinguished therefrom by the fact that this link may be displaced, so that the safety device in each case admits of being adjusted for every particular pressure in a very simple manner.

My invention will be more fully described with reference to the accompanying drawing, showing by way of example various modifications as illustrative forms of embodiment of the invention.

Figure 1 is a top plan view of an exemplification applied to the manually operated lateral clamping jaw of horizontal forging machines, and Figures 2 and 3 show different positions of the clamping jaw. Figure 4 is another modification in which the pressure-safety device is combined with the upsetting or jolting bar of a horizontal forging machine, and Figures 5 and 6 are details thereof.

In the exemplification according to Figures 1 to 3 the clamp of a horizontal forging machine is shown at 1 which, together with the carriage 2 tightly clamps the piece of work to be forged. It is connected to the transversely movable carriage 3 by means of the links or hinged levers 4, 5. The carriage 3 is adapted to be moved against a set screw 9 provided in the machine frame 8 by a screw threaded spindle 6 and the manually operated crank 7, and in such a manner that the links 4, 5 will be arrested previous to reaching the dead-center or stretching position. In view of the fact that the links or levers 4, 5 are disposed at an angle of inclination to the line of pressure of the clamp 1, the carriage 3 tends to give way and to move to the right, when a pressure occurs. The crank handle 7 is secured by means of a key, wedge or four-cornered nut or the like to the spindle 6 which is likewise moved upon the moving of the links. The spindle 6 is retained against axial strain by the tearing bolt 10 on the crank handle 7. The tearing bolt therefore prevents the carriage 3 from moving to the right, until the maximum pressure for which the safety device is intended has been reached; then the bolt 10 is severed, and the carriage 3 is forced to the right, while the clamp 1 is released. Figure 2 shows the clamp 1 in the open position; and the same position is shown in Figure 3, but after the tearing off of the shearing bolt 10.

By the adjustment of the set screw 9 the angular or inclined position of the links 4, 5 in the operating position may be changed, so as to also vary the ratio of transmission between the pressure to which the safety device responds in the clamping direction and the tensional strain prevailing in the spindle 6. The safety device may be adjusted by tests in such a manner that for each particular machine the reliable operation of the safety device is insured.

If, after extended use, the carriage 3 has worn its guide, so as to move too freely or loosely therein, resulting in a consequent reduction of the frictional coefficient between the carriage 3 and the guide, this condition will be indicated by the bolt 10 being severed more easily. By turning back the set screw 9 this difficulty may be readily remedied. The set screw may also be employed for compensating differences in the dies or matrices which had to be balanced heretofore by packing material.

In the modification according to Figure 4 of the drawing the flexing or collapsing bar is provided so as to serve as the maximum pressure safety device for the jolting or upsetting means of a horizontal forging machine, eccentric press or similar device. In this modification the pressure bar operated by the crank shaft 21 comprises the two elbow levers or bell crank levers 16, 17 which are connected to each other by means of a joint 18 offset from or disposed laterally with relation to the line of pressure of the pressure bar. The free forked arms of the elbow levers 16, 17 are connected to each other by a tearing bolt 19. The set screw 20 serves as a supporting abutment.

As appears from Figure 5, it is possible by adjusting the screw 20, to vary the angular relationship of the forked arms of the levers 16, 17 and thereby increase or diminish the lateral deviation or offset relation of the connecting joint or pivot 18 relatively to the line of pressure of the pressure bar, so that the manner of operation of the flexing or collapsing bar may be exactly adjusted. Figure 6 shows the flexing or collapsing bar in the open position after the severing of the tearing bolt 19. It will be observed that with this construction the breaking point 19 is eccentric to the pivots 18, 21, that points 18 and 19 are consequently eccentric to the line of pressure, and that the eccentricity of these points to the line of pressure remains constant regardless of the position of the connecting rod, so that the breakable connection 19 may operate with equal efficiency at any point in the stroke where breaking pressure occurs.

While I have herein shown some of several ways of accomplishing the object of the present invention, it should be understood that the invention is not limited to these illustrative exemplifications, and that it is susceptible of modifications and changes in the arrangement of details, and the construction and configuration of parts, without deviating from the spirit and scope of the invention, except as otherwise stated in the appended claims.

I claim:—

1. In a device of the kind described, a pressure member, a driving member, a pivotal connection between said members offset with relation to the line of pressure and movable laterally thereof, adjusting means for varying the degree of offset of said pivotal connection with relation to the line of pressure, and frangible means for limiting movement of the pivotal members, said frangible means being collapsible under predetermined pressure.

2. In a device of the kind described in combination, a movable pressure member, a driving member, a pair of angular levers operatively connected between the driving member, a connection between the levers and pressure member laterally offset from the line of pressure thereof, means to vary the offset position of said connection, and a frangible member connecting the levers which is adapted to be severed at a certain pressure.

3. In a device of the kind described in combination, a movable pressure member, a driving member, an angular lever having one arm thereof operatively connected to the driving member, an additional angular lever linked to the other angular lever and hingedly connected to the pressure member, an adjustable setting member in one arm of one of the levers and engageable with the other lever, and a frangible member connecting the free arms of both levers and adapted to be severed at a certain pressure.

4. In a device of the character described, in combination, a movable pressure member, a driving member, levers pivotally connected respectively to the pressure member and driving member and pivotally connected to each other at a point offset laterally from the line of movement of the pressure member, adjusting means for varying the degree of lateral offset of the pivotal connection between the levers with relation to the line of pressure of the pressure member, and means for adjustably holding the levers in a set position to prevent greater lateral movement of the pivotal connection between the levers until a predetermined pressure is reached when said means will collapse to permit said pivotal connection between the levers to move laterally to a greater degree.

5. A safety connection for machine elements comprising the combination of a plurality of elbow-shaped links adapted to be connected to a pressure member and a driving member respectively, said links being pivotally connected to each other, the said pivot connection being offset laterally from the line of pressure, adjustable means for limiting the movement of said links in the direction which the pivotal connection is offset, and yielding means which permits movement of said links when pressure effects a collapse of said yielding means under a predetermined pressure.

6. In a safety connection for machine elements, a pressure member, a driving member, two elbow-shaped members operatively connected with the pressure member and driving member, said elbow members being pivotally connected at their corner angles and having their pivotal connection offset laterally from the line of pressure of the pressure element and arranged eccentrically thereto, an adjustable stop device for limiting the movement of said members in one direction, and yielding means adapted to permit movement of said members in the opposite direction for a collapsing action under a predetermined pressure.

7. In a device of the kind described, a movable pressure member and a driving member, an arm carried by the pressure member, an arm carried by the driving member and movably connected with the pressure member arm, a frangible element held in connecting relation to said arms, and means between the arms for adjusting the same toward and away from each other whereby to maintain the frangible element under tension.

In testimony whereof I affix my signature.

OTTO GEORG.